United States Patent
Allison et al.

(10) Patent No.: US 11,009,074 B1
(45) Date of Patent: May 18, 2021

(54) LIGHTWEIGHT BEARING CAGE FOR TURBINE ENGINES AND METHOD OF FORMING A LIGHTWEIGHT BEARING CAGE

(71) Applicant: AKTIEBOLAGET SKF, Gothenburg (SE)

(72) Inventors: Bryan Allison, Clymer, NY (US); Joanna Dzwonczyk, Ijsselstein (NL); Joshua Fitzgerald, Sherman, NY (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/679,714

(22) Filed: Nov. 11, 2019

(51) Int. Cl.
*F16C 33/56* (2006.01)
*B21D 53/12* (2006.01)

(52) U.S. Cl.
CPC ............. *F16C 33/56* (2013.01); *B21D 53/12* (2013.01); *F16C 2204/20* (2013.01); *F16C 2360/23* (2013.01)

(58) Field of Classification Search
CPC ........ F16C 33/44; F16C 33/50; F16C 33/502; F16C 33/508; F16C 33/56; F16C 33/2204; F16C 33/20; F16C 2360/23
See application file for complete search history.

(56) References Cited

U.S. PATENT DOCUMENTS

| | | | | |
|---|---|---|---|---|
| 4,832,737 A | * | 5/1989 | Mathy | C22C 1/0416 75/249 |
| 7,919,056 B2 | | 4/2011 | Roberge et al. | |
| 9,670,567 B2 | | 6/2017 | Jarry | |
| 10,215,234 B2 | | 2/2019 | Loemba et al. | |
| 2005/0006010 A1 | | 1/2005 | Benedictus et al. | |
| 2005/0115645 A1 | | 6/2005 | Fischer et al. | |
| 2007/0084527 A1 | * | 4/2007 | Ferrasse | C22F 1/00 148/550 |
| 2012/0085470 A1 | * | 4/2012 | Segal | C22F 1/057 148/695 |
| 2013/0177271 A1 | | 7/2013 | Jaekel et al. | |

(Continued)

FOREIGN PATENT DOCUMENTS

| | | |
|---|---|---|
| CN | 202348767 U | 7/2012 |
| CN | 205173239 U | 4/2016 |

(Continued)

OTHER PUBLICATIONS

Paul F. Brown, "Bearing Retainer Material for Modern Jet Engines", ASLE Transactions 13, pp. 225-239, 1970, Connecticut, US.

(Continued)

*Primary Examiner* — Phillip A Johnson
(74) *Attorney, Agent, or Firm* — J-TEK Law PLLC; Scott T. Wakeman; Mark A. Ussai

(57) ABSTRACT

A rolling-element bearing cage or a rolling-element bearing cage segment includes a first side ring or a first side ring segment formed from aluminum alloy AA2618, a second side ring or a second side ring segment formed from aluminum alloy AA2618, and at least one bridge formed from aluminum alloy AA2618, the at least one bridge connecting the first side ring to the second side ring or connecting the first side ring segment to the second side ring segment.

14 Claims, 2 Drawing Sheets

(56) References Cited

U.S. PATENT DOCUMENTS

| | | | |
|---|---|---|---|
| 2013/0243358 A1* | 9/2013 | Stork | F16C 33/504 384/445 |
| 2016/0108965 A1* | 4/2016 | Kokumai | F16C 33/3831 384/463 |
| 2018/0149199 A1* | 5/2018 | Loemba | C22C 21/18 |

FOREIGN PATENT DOCUMENTS

| | | | | |
|---|---|---|---|---|
| DE | 10037138 C1 | | 10/2001 | |
| DE | 102010044886 A1 | | 5/2011 | |
| DE | 102010042849 A1 | | 4/2012 | |
| DE | 102010047142 A1 | | 4/2012 | |
| DE | 102012216810 A1 | | 3/2014 | |
| DE | 102014215066 A1 | * | 2/2016 | C22C 21/10 |
| DE | 102015221275 A1 | | 5/2016 | |
| JP | H09151945 A | | 6/1997 | |
| JP | H09170625 A | | 6/1997 | |
| JP | 2009257416 A | | 11/2009 | |
| JP | 2012246994 A | | 12/2012 | |
| WO | 2005100623 A2 | | 10/2005 | |
| WO | 2010066293 A1 | | 6/2010 | |
| WO | WO-2016012306 A1 | * | 1/2016 | F16J 1/00 |

OTHER PUBLICATIONS

Search Report from the British Patent Office dated Jan. 6, 2021 in related application No. GB2012498.8.

* cited by examiner

LIGHTWEIGHT BEARING CAGE FOR TURBINE ENGINES AND METHOD OF FORMING A LIGHTWEIGHT BEARING CAGE

TECHNOLOGICAL FIELD

The present disclosure is directed to a rolling-element bearing cage or a rolling-element bearing cage segment and to a method for manufacturing a rolling-element bearing cage or a rolling-element bearing cage segment.

BACKGROUND

Rolling-element bearing cages or rolling-element bearing cage segments are used in different rolling-element bearings to guide rolling elements and space the rolling elements from each other. These cages and cage segments can have a variety of different configurations and can be made from a variety of different materials that are selected, for example, based on the type of bearing in which the cages will be used.

Some rolling-element bearing cages are sometimes manufactured from brass or steel. The acquisition cost of brass is relatively high because one component of brass, namely copper, is a relatively scarce material. In addition, lead is used in many manufacturing processes for rolling-element bearing cages made from brass. Steel bearing cages, on the other hand, are often electroplated with silver. Silver is also expensive, and care must be taken with electroplating processes to avoid injuring workers or releasing potentially hazardous materials into the environment.

This can pose particular challenges for environmental and/or worker protection and increases the cost of brass or coated steel bearing cages.

It is also known to manufacture bearing cages made from certain alloys of aluminum. For example, U.S. Pat. No. 10,215,234, issued to the present applicant and incorporated herein by reference in its entirety, teaches that either aluminum alloy AA6082 or aluminum alloy AA7020 can be used to form bearing cages that are suitable for use in certain environments. These environments do not include high temperature environments, such as those found in gas turbine engines. It is therefore still necessary to use brass or materials other that aluminum for bearing cages that are to be used in high temperature environments.

SUMMARY

There is therefore a need to provide an improved rolling-element bearing cage or a rolling-element bearing cage segment that is simple to manufacture. This need is met by a rolling-element bearing cage or a rolling-element bearing cage segment or a method for manufacturing a rolling-element bearing cage or a rolling-element bearing cage segment according to the present disclosure.

Exemplary embodiments relate to a rolling-element bearing cage or rolling-element bearing cage segment, which comprises as material aluminum alloy AA 2618. Since this alloy is used as material, in some exemplary embodiments conventional rolling-element bearing cages made from brass or steel can be replaced. Moreover, because this material is both suitable for forming a bearing cage and is able to withstand high temperatures, such as those found in gas turbine engines, bearing cages formed from this alloy can be used in environments where previous aluminum bearing cages could not be used.

In addition, the material or the aluminum alloy can have a tensile strength of at least 420 MPa. Here the tensile strength can be a material parameter that is specified in force per unit area and is specified by the symbol $R_M$. Additionally or alternatively, in some exemplary embodiments the material can have a yield strength of at least 340 MPa. The yield strength can be, for example, a material parameter that specifies a tension applied to a body, which after release results in a slight deformation of 0.2% and is referred to as $R_{P0.2}$. Additionally or alternatively the material can also have a hardness of at least 120 HBW and an A5 elongation of at least 7%. Due to the mechanical values mentioned of the material, in some exemplary embodiments the rolling-element bearing cage can obtain similar or even better mechanical properties than a conventional brass cage or of a cage made of other aluminum alloys. Under certain circumstances the hardness of the chosen material can also be relevant for a later processing. With high or high-strength alloys the problem can arise in some exemplary embodiments that the alloys cannot be riveted. Under certain circumstances with a hardness that is too low or a material that is too soft a cold welding can occur. Furthermore, materials that are too soft may not be possible to process dry.

Additionally or alternatively the rolling-element bearing cage can be free of lead. In some exemplary embodiments precautions that serve to prevent lead from reaching the environment or for particular protection of workers from lead can be omitted. In an analogous manner, for example, a manufacturing of the rolling-element bearing cage can also occur in a lead-free manner so that lead also does not arise as a processing aid or intermediate product. In some exemplary embodiments the rolling-element bearing cage can be manufactured with the lowest possible burdens on the environment.

In some exemplary embodiments the rolling-element bearing cage is machined from a semi-finished product, which has been subjected to a T6 (e.g., T61 or T62) heat treatment. In some exemplary embodiments the rolling-element bearing cage can thus obtain the required mechanical properties.

Exemplary embodiments further relate to a method for manufacturing a rolling-element bearing cage or a rolling-element bearing cage segment. With the method the rolling-element bearing cage or the rolling-element bearing cage segment is formed from aluminum alloy AA2618. Since this alloy is used as material, in some exemplary embodiments conventional rolling-element bearing cages made from brass or steel other aluminum alloys can be replaced. Furthermore, in some exemplary embodiments the rolling-element bearing cages made from AA2618 can have a low weight.

In addition, forming the rolling-element bearing cage can comprise machining a semi-finished product made from the aluminum alloy AA2618. In some exemplary embodiments the cage geometry can thus be manufactured very precisely. Furthermore, possibly desired surface properties of the cage can thus be generated.

Under certain circumstances the machining can take place dry. Since no cooling lubricant or other liquid is used, in some exemplary embodiments a cleaning effort of the rolling-element bearing cage, the environment, and/or a processing tool can be reduced and/or even completely omitted. A collecting and/or treatment of the cooling lubricant can also be omitted.

Additionally or alternatively the method can comprise manufacturing the semi-finished product, wherein the manufacturing of the semi-finished product comprises shaping a rod made from the aluminum alloy. In some exemplary embodiments the rolling-element bearing cage can then be machined from a semi-finished product that already has a favorable initial geometry. For example, the rod can be extruded. In other exemplary embodiments, a disk of material may be subjected to a ring rolling process until it achieves approximately the correct dimensions after which the ring rolled semi-finished product can be machined to achieve its desired dimensions.

Under certain circumstances the manufacturing of the semi-finished product can alternatively also comprise forming a tube. In some exemplary embodiments a volume that is machined, for example in a radially inner region, can thus be reduced. For example, the tube can be drawn for this purpose.

Additionally or alternatively, in some exemplary embodiments the manufacturing of the semi-finished product comprises forming a tube from a rod. In some exemplary embodiments the semi-finished product can thus obtain the desired properties and the desired shape.

Furthermore, the method can comprise a T6 heat treatment of the aluminum alloy, of the semi-finished product, of the rod, and/or of the tube. In some exemplary embodiments manufacturing the tube from the rod can thereby be simplified since the heat treatment is only performed on the tube. Since the heat treatment occurs, in some exemplary embodiments the semi-finished product, for example, the tube, can obtain the described mechanical properties. A T6 heat treatment can comprise, for example, a quenching in a solution and/or water and using a solid. An aging can subsequently occur, for example, by an air cooling. In some exemplary embodiments the T6 heat treatment can comprise only the processes mentioned. Optionally the T6 heat treatment can also comprise a solution annealing, a quenching, and an artificial aging, or be comprised entirely of these processes.

Additionally or alternatively the method can comprise riveting a plurality of rolling-element bearing cage segments. In some exemplary embodiments the rolling-element bearing cage can thus be assembled from individual parts. This can be favorable, for example, for assembly and/or transport purposes, particularly with large rolling-element bearing cages. Here the individual parts or a rolling-element bearing cage segment can be, for example, a bridge, a side ring, a segment of a side ring, a flange, a section of a bridge and/or a rolling-element bearing cage segment, which comprises at least one bridge and at least one further section, for example, a segment of a side ring.

The exemplary embodiments and their individual features disclosed in the above description, the following claims, and the accompanying Figures can be meaningful and implemented both individually and in any combination for the realization of an exemplary embodiment in its various designs.

BRIEF DESCRIPTION OF THE DRAWINGS

These and other aspects of the invention will be better understood after a reading of the following detailed description together with the attached drawings wherein.

DETAILED DESCRIPTION

In the following description of the accompanying Figures, like reference numbers refer to like or comparable components. Furthermore, summarizing reference numbers are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

The rolling-element bearing cage 1 comprises an aluminum alloy as material. The aluminum alloy is AA2618. The rolling-element bearing cage 1 comprises a plurality of rolling-element bearing cage segments 3. The rolling-element bearing cage segment 3 can also be manufactured from AA2618. In some exemplary embodiments, since AA2618 is used as material, conventional rolling-element bearing cages made of Fe or other aluminum alloys can be replaced. In some further exemplary embodiments (not illustrated) the rolling-element bearing cage segment can have a different shape or the cage can be formed in a unitary manner rather than from a plurality of cage segments.

AA2618 is not the most suitable aluminum alloy for bearing cages that will be used in certain environments. For example, the relatively low corrosion resistance and overall hardness of this alloy make it less than ideal for use in wheel bearings (e.g., in trucks, trains and automobiles) where the bearing cage may be exposed to moisture or contaminants. However, despite this relatively low corrosion resistance and relatively low overall hardness, aluminum alloy AA2618 has a relatively high hardness at the elevated temperatures, e.g., over 150° C., found in environments such gas turbine engines. It also has a fatigue strength that makes it suitable for use as a bearing cage in a gas turbine engine. These properties make it possible to obtain the benefits of using an aluminum alloy bearing cage in gas turbine engines and other high temperature environments where the use of aluminum alloy bearing cages has heretofore not been possible or practicable.

Figure 1:
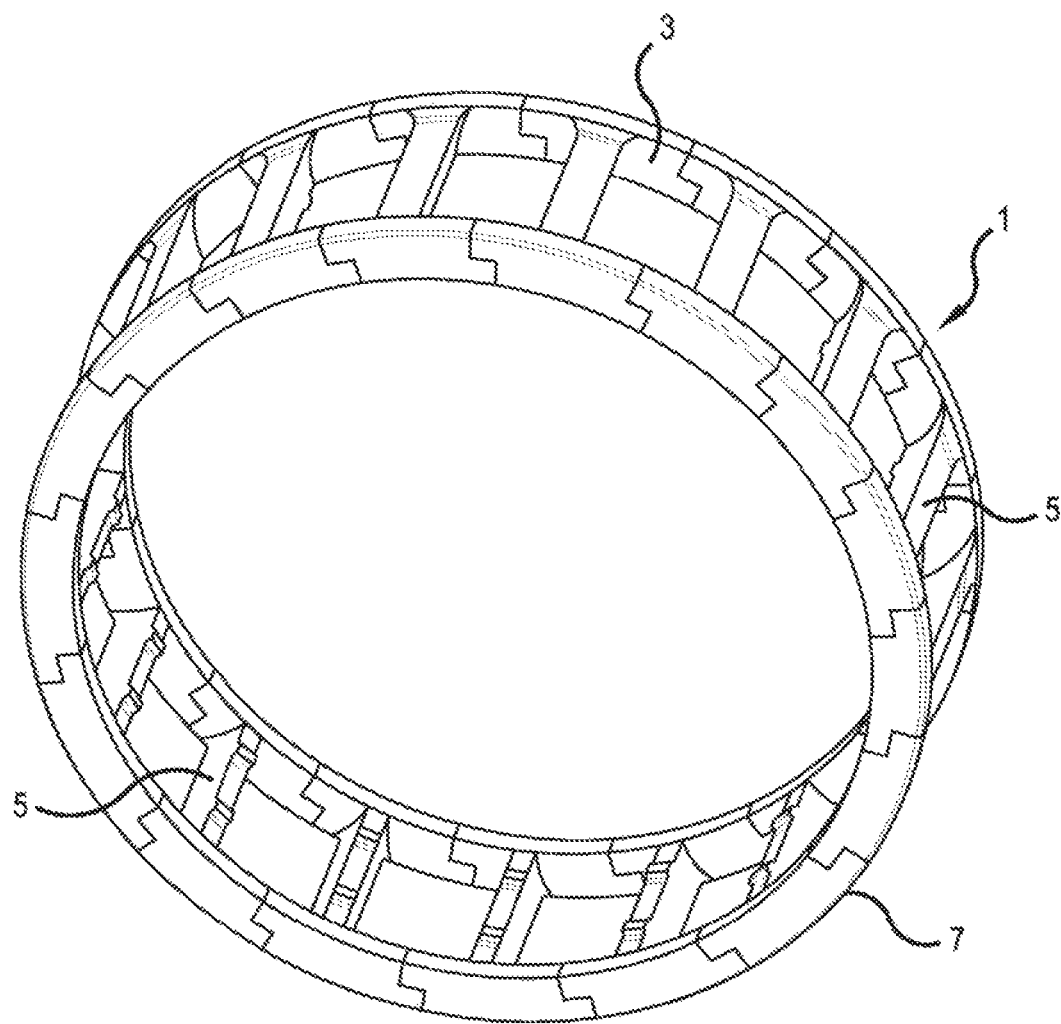
FIG. 1 is a perspective view of a rolling-element bearing cage according to an embodiment of the present disclosure.

The rolling-element bearing cage 1 of FIG. 1 can be used in a tapered roller bearing. In some further exemplary embodiments (not illustrated) the rolling-element bearing cage or the rolling-element bearing cage segment can also be configured to be used in other rolling-element bearings, for example, needle roller bearings, cylindrical roller bearings, barrel roller bearings, or the like. The cage can be configured for use with a single-row or also for a multi-row bearing. The rolling-element bearing cage can also be configured for use in a multi-row tapered roller bearing.

In addition to aluminum (Al), the aluminum alloy AA2618 comprises as alloy components copper (Cu) with a proportion of 1.9 to 2.7 weight percent, magnesium (Mg) with a proportion of 1.3 to 1.8 weight percent, iron (Fe) with a proportion of 0.9 to 1.3 weight percent, nickel (Ni) with a proportion of 0.9 to 1.2 weight percent, silicon (Si) with a proportion of 0.1 to 0.25 weight percent, titanium (Ti) with a proportion of 0.04 to 0.1 weight percent, and, optionally, zinc, (Zn), with a proportion of 0.0 to 0.1 weight percent.

Here the rolling-element bearing cage 1 is manufactured entirely from AA2618. In some further exemplary embodiments (not illustrated) the rolling-element bearing cage can comprise still other raw materials or materials in addition to the mentioned aluminum alloy such as a coating, a lubricant, and/or connecting structures or the like. The connecting structures can be, for example, rivets. The coating could be silver or a physical vapor deposition ceramic coating such as, for example, titanium nitride or chromium nitride.

The rolling-element bearing cage 1 can optionally be free of lead. Under certain circumstances a manufacturing of the cage can also occur without a use of lead.

Figure 2:
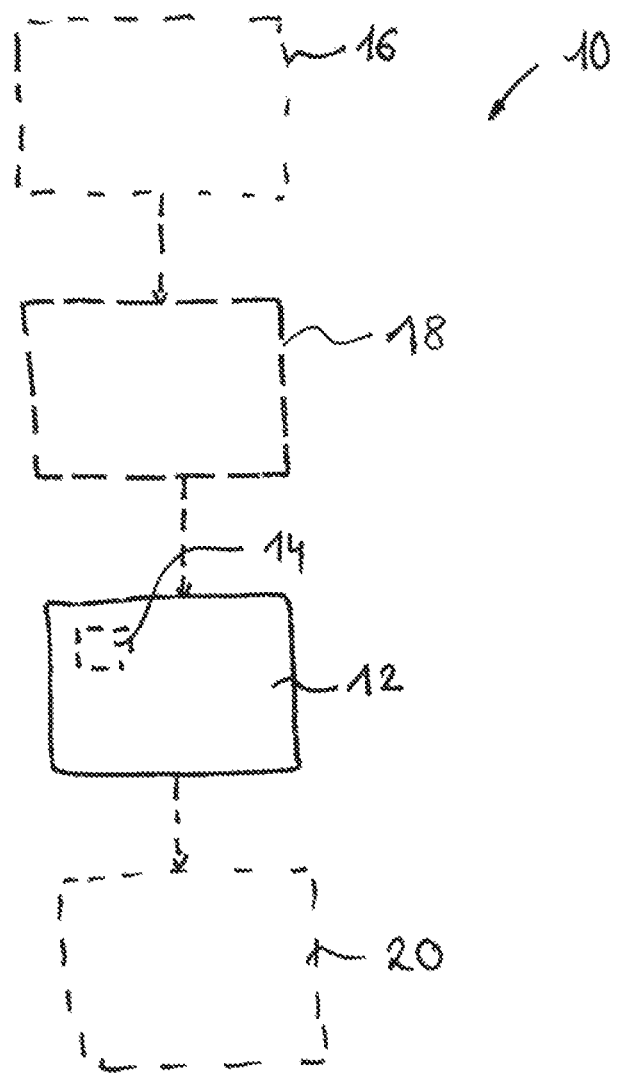
FIG. 2 is a flow chart showing a method for manufacturing a rolling-element bearing cage or a rolling-element bearing cage segment according to an embodiment of the present disclosure.

FIG. 2 shows a schematic depiction of a method 10 for manufacturing a rolling-element bearing cage or a rolling-element bearing cage segment according to an exemplary embodiment. In the method 10 the rolling-element bearing cage or the rolling-element bearing cage segment is formed in a process 12 from aluminum alloy AA2618.

The properties of the material can be influenced by the individual alloy components of the chosen alloy. For example, magnesium can increase a strength and a hardness of the material, support its corrosion resistance, and improve its weldability. The higher strength can arise, for example, due to a solid solution strengthening. The hardness can potentially be increased by more than 6% by a precipitation heat treatment. Silicon can improve a heat-treatability of alloys and, in combination with magnesium (Mg), support the corrosion resistance. Furthermore, under certain conditions a flowability can be improved and a shrinking can be reduced. Due to these properties a use as casting alloy is broadened. Zinc (Zn) can increase a strength and a hardness as well as possibly reduce a shrinking and a heat checking. In combination with Magnesium (Mg) a heat-treatability as well as a strength of the alloy can possibly be improved. In combination with iron, under certain circumstances a casting capacity can also be improved. An emergence of intermetallic compounds can also possibly be influenced. A deformability of the material as well as a ductility can potentially be increased. In some cases shrinking can also thereby be reduced.

The process 12, i.e., a forming of the rolling-element bearing cage, can comprise a further process 14 wherein a semi-finished product is machined. The semi-finished product here is manufactured from the aluminum alloy AA2618. The semi-finished product can be, for example, a prefabricated object. This can arise, for example, at the beginning of a manufacturing process and then further processed. Here they can possibly be extruded, pressed, drawn, deep-drawn, rolled, and/or extruded components. Under certain circumstances semi-finished products can be a metal plate, a rod, a tube, a plate, a coil, or the like. The semi-finished product can be, for example, a tube or a rod.

A metal cutting or a machining of a component, for example, of a semi-finished product, can indicate, for example, a mechanical processing method wherein a raw material or a material is brought into a desired form by removing excess raw material or material in the form of chips. Such mechanical processing methods can be, for example, turning, milling, boring, sawing, and/or grinding.

Under certain circumstances the machining in process 14 can be effected without the use of cooling lubricant or another liquid. The selected materials can be dry-processed.

The method 10 can also optionally comprise a further process 16, wherein the semi-finished product is manufactured. The process 16 can temporally precede the process 12. The manufacturing of the semi-finished product can comprise a forming of a rod from the aluminum alloy. Under certain circumstances the manufacturing of the semi-finished product can alternatively also comprise a forming of a tube. Additionally or alternatively in some exemplary embodiments the manufacturing of the semi-finished product in process 16 comprises a forming of a tube from a rod. For example, the rod can be extruded. For example, the tube can be drawn from the rod. In some cases tube material can have a higher strength than rod products.

Furthermore, in a further process 18 the method can comprise a T6 heat treatment of the tube, which has been manufactured from the rod. Because the heat treatment occurs the material AA2618 can receive the following mechanical properties: a tensile strength $R_m$ of at least 420 MPa and a yield strength $R_{P0.2}$ of at least 340 MPa, an A5 elongation of 7% and a minimum fatigue strength of 110 MPa.

These values apply for a failure probability of 10% with 107 cycles for alternating rotating bending stress resistance. In comparison thereto a different heat treatment, for example, a T0 heat treatment, would only lead to lower strengths and a greater A5 elongation.

A T6 heat treatment can comprise, for example, a duplex sequence of solution/water-solid quenching, then aging/air-cooling, or be comprised entirely of these. Optionally the T6 heat treatment can also comprise a solution annealing, a quenching, and an artificial aging, or be comprised entirely of these. The materials can thus have other mechanical properties after the extrusion. In an analogous manner to a variation of extrusion parameters the variation can be too high. A relationship between a temperature reduction and an extrusion speed can determine the mechanical properties. Thus these are also dependent on an extruder and its machine capabilities. Under certain circumstances the mechanical properties can be changed in a desired direction by the heat treatment.

Additionally or alternatively in a process 20 the method 10 can comprise a riveting of a plurality of rolling-element bearing cage segments. AA2618 can be riveted, a property that is very important for some cage types. In some exemplary embodiments the rolling-element bearing cage can thus be assembled from individual parts. The individual parts or a rolling-element bearing cage segment here can be, for example, a bridge 5 or a side ring 7, as depicted in FIG. 1. Furthermore, the individual part can also be a segment of a side ring 7, a flange, a section of a bridge 5, and/or rolling-element bearing cage segments that comprise at least one bridge and at least one further section, for example, a segment of a side ring.

In an exemplary embodiment of the method 10 for manufacturing the rolling-element bearing cage 1 the aluminum alloy AA2618 is formed into a rod, for example, extruded. A tube is then drawn from the rod. This can be referred to as manufacturing of the semi-finished product in the process 16. Due to the forming into a tube a strength of the material can possibly be increased. In the process 18 the tube is subsequently subjected to the T6 heat treatment. Since the heat treatment is only performed after the forming into the tube, in some exemplary embodiments the forming itself can occur better. The tube, which can also be referred to as tube material, is subsequently dry turned and/or milled in process 14. In some exemplary embodiments the cage can thereby receive its geometry with a smallest-possible contamination of the tools, the workpieces, and the environment.

In the present application all features that are disclosed in the context of a rolling-element bearing cage can also be implemented in a rolling-element bearing cage segment.

The exemplary embodiments and their individual features disclosed in the above description, the following claims, and the accompanying Figures can be meaningful and implemented both individually and in any combination for the realization of an exemplary embodiment in its various designs.

In some further exemplary embodiments, features that are disclosed in other exemplary embodiments as device features can also be implemented as method features.

Furthermore, features that are implemented in some exemplary embodiments as method features can also optionally be implemented in other exemplary embodiments as device features.

What is claimed is:

1. A rolling-element bearing cage comprising aluminum alloy AA2618.

2. A rolling-element bearing cage or a rolling-element bearing cage segment comprising:
   a first side ring or a first side ring segment formed from aluminum alloy AA2618;
   a second side ring or a second side ring segment formed from aluminum alloy AA2618; and
   at least one bridge formed from aluminum alloy AA2618, the at least one bridge connecting the first side ring to the second side ring or connecting the first side ring segment to the second side ring segment.

3. The rolling-element bearing cage or rolling-element bearing cage segment according to claim 2, wherein the aluminum alloy AA2618 has a tensile strength $R_m$ of at least 420 MPa.

4. The rolling-element bearing cage or rolling-element bearing cage segment according to claim 2, wherein the rolling-element bearing cage is formed entirely from AA2618.

5. The rolling-element bearing cage or rolling-element bearing cage segment according to claim 2, wherein the aluminum alloy AA2618 has a yield strength $R_{P0.2}$ of at least 340 MPa.

6. The rolling-element bearing cage or rolling-element bearing cage segment according to claim 2, wherein the aluminum alloy AA2618 has a hardness of at least 120 HBW.

7. The rolling-element bearing cage or rolling-element bearing cage segment according to claim 2, wherein the rolling-element bearing cage comprises a plurality of the rolling-element bearing cage segments joined together by rivets.

8. A method comprising:
   providing a body of aluminum alloy AA2618; and
   forming the body into a rolling-element bearing cage comprising a first side ring, a second side ring and a plurality of bridges connecting the first side ring to the second side ring or forming the body into a rolling-element bearing cage segment comprising a first side ring segment, a second side ring segment and at least one bridge connecting the first side ring segment to the second side ring segment.

9. The method according to claim 8, wherein the body is a semi-finished body and wherein the forming comprises machining the semi-finished body.

10. The method according to claim 9, wherein the machining occurs dry.

11. The method according to claim 9, wherein providing the body comprises forming a rod of aluminum alloy AA2618 into a tube.

12. The method according to claim 11, further comprising performing a T6 heat treatment on the tube.

13. The method according to claim 8, further comprising performing a T6 heat treatment on the body or on the bearing cage or on the bearing cage segment.

14. The method according to claim 8, wherein forming the body into a rolling-element bearing cage comprises forming a plurality of the bearing cage segments and riveting the plurality of bearing cage segments together.

\* \* \* \* \*